(12) United States Patent  
Noh et al.

(10) Patent No.: US 8,764,603 B1
(45) Date of Patent: Jul. 1, 2014

(54) PLANETARY GEAR TRAIN OF AUTOMATIC TRANSMISSION FOR VEHICLE

(71) Applicant: Hyundai Motor Company, Seoul (KR)

(72) Inventors: Myonghoon Noh, Seongnam-si (KR); Hyu Tae Shim, Hwaseong-si (KR); Kangsoo Seo, Yongin-si (KR); Jae Chang Kook, Hwaseong-si (KR); Chang Wook Lee, Suwon-si (KR); Jongsool Park, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/067,755

(22) Filed: Oct. 30, 2013

(30) Foreign Application Priority Data

Dec. 10, 2012 (KR) .................... 10-2012-0143088

(51) Int. Cl.
*F16H 3/44* (2006.01)
(52) U.S. Cl.
USPC ........................................ 475/288; 475/302
(58) Field of Classification Search
USPC ......... 475/288, 284, 271, 269, 330, 296, 214, 475/302, 275, 311
See application file for complete search history.

(56) References Cited

U.S. PATENT DOCUMENTS

| 7,824,303 | B2* | 11/2010 | Wittkopp et al. | 475/311 |
| 8,083,633 | B2* | 12/2011 | Wittkopp et al. | 475/296 |
| 8,226,512 | B2* | 7/2012 | Wittkopp et al. | 475/5 |
| 2011/0111912 | A1* | 5/2011 | Wittkopp et al. | 475/219 |

* cited by examiner

*Primary Examiner* — David D Le
*Assistant Examiner* — David J Hlavka
(74) *Attorney, Agent, or Firm* — McDermott Will & Emery LLP (57) ABSTRACT

A planetary gear train of an automatic transmission for a vehicle may include: an input shaft, an output shaft disposed in parallel with the input shaft, a first planetary gear set disposed on the input shaft, a second planetary gear set disposed on the output shaft, a third planetary gear set disposed on the output shaft, three transfer gears forming an externally-meshed gears, and frictional elements selectively interconnecting rotation elements or selectively connecting the rotation elements to a transmission housing. The first planetary gear set includes a first ring gear, a first planet carrier, and a first sun gear. The second planetary gear set includes a second sun gear, a second planet carrier, and a second ring gear. The third planetary gear set includes a third sun gear, a third planet carrier, and a third ring gear.

7 Claims, 11 Drawing Sheets

|  | B1 | C1 | C2 | C3 | C4 | Gear ratio |
|---|---|---|---|---|---|---|
| 1ST | ● | ● |  |  | ● | 4.021 |
| 2ND | ● |  |  | ● | ● | 2.660 |
| 3RD |  | ● |  | ● | ● | 1.829 |
| 4TH |  |  | ● | ● | ● | 1.486 |
| 5TH |  | ● | ● |  | ● | 1.211 |
| 6TH |  | ● | ● | ● |  | 0.923 |
| 7TH | ● | ● | ● |  |  | 0.736 |
| 8TH | ● |  | ● | ● |  | 0.611 |
| Rev | ● |  | ● |  | ● | −1.467 |

PLANETARY GEAR TRAIN OF AUTOMATIC TRANSMISSION FOR VEHICLE

CROSS-REFERENCE TO RELATED APPLICATION

This application claims the benefit of priority to Korean Patent Application No. 10-2012-0143088 filed in the Korean Intellectual Property Office on Dec. 10, 2012, the entire contents of which are incorporated herein by reference.

TECHNICAL FIELD

The present inventive concept relates to an automatic transmission for a vehicle. More particularly, the present inventive concept relates to a planetary gear train of an automatic transmission for a vehicle that can improve mountability by reducing a length thereof and reduce fuel consumption by improving power delivery performance.

BACKGROUND

Typically, a planetary gear train is realized by combining a plurality of planetary gear sets and friction members. It is well known that when a planetary gear train realizes a greater number of shift speeds, speed ratios of the planetary gear train can be more optimally designed, and therefore a vehicle can have economical fuel or gas mileage and better performance. For that reason, the planetary gear train that is able to realize the greater number of shift speeds is under continuous investigation.

Though achieving the same number of speeds, the planetary gear train has a different operating mechanism according to a connection between rotation elements (i.e., sun gear, planet carrier, and ring gear). In addition, the planetary gear train has different features such as durability, power delivery efficiency, and size, depending on the layout thereof. Therefore, designs for a combining structure of a gear train are also under continuous investigation.

In addition, the planetary gear train realizes a plurality of shift-speeds. However, another friction member must be operated after one friction member is released so as to shift to a neighboring shift-speed from a view of shift control. In addition, a step ratio between the neighboring shift-speeds should be controlled to be suitable according to the planetary gear train.

The above information disclosed in this Background section is only for enhanced understanding of the background of the inventive concept and therefore it may contain information that does not form the prior art.

SUMMARY

The present inventive concept has been developed to provide a planetary gear train of an automatic transmission for a vehicle having advantages of improved mountability by shortening a length thereof and reducing fuel consumption by improved power delivery performance. The advantages are obtained as a consequence of achieving eight forward speeds and one reverse speed having excellent operating conditions of frictional elements and step ratios by combining three planetary gear sets separately disposed on an input shaft and an output shaft, three externally-meshing gears, and five frictional elements.

According to an exemplary embodiment of the present inventive concept, a planetary gear train of an automatic transmission for a vehicle includes: an input shaft receiving torque of an engine; an output shaft disposed in parallel with the input shaft; a first planetary gear set disposed on the input shaft, the first planetary gear set including a first ring gear directly connected to the input shaft so as to be always operated as an input element, a first planet carrier selectively operated as an output element, and a first sun gear selectively operated as an output element and a fixed element, as rotation elements thereof; a second planetary gear set disposed on the output shaft, the second planetary gear set including a second sun gear connected to the first planet carrier through an externally-meshed gear, a second planet carrier selectively connected to the first sun gear through an externally-meshed gear, and a second ring gear operated as an output element, as rotation elements thereof; a third planetary gear set disposed on the output shaft, the third planetary gear set including a third sun gear selectively connected to the first ring gear and the input shaft through an externally-meshed gear, a third planet carrier directly connected to the second ring gear and the output shaft, and a third ring gear selectively connected to the first sun gear through an externally-meshed gear and selectively connected to the second planet carrier, as rotation elements thereof; three transfer gears forming the externally-meshed gears; and frictional elements selectively interconnecting the rotation elements or selectively connecting the rotation elements to a transmission housing.

The first planetary gear set may be a double pinion planetary gear set and each of the second and third planetary gear sets may be a single pinion planetary gear set.

The three transfer gears may include: a first transfer gear including a first transfer drive gear selectively connected to the first ring gear and the input shaft and a first transfer driven gear connected to the third sun gear; a second transfer gear including a second transfer drive gear connected to the first planet carrier and a second transfer driven gear connected to the second sun gear; and a third transfer gear including a third transfer drive gear selectively connected to the first sun gear and a third transfer driven gear connected to the third ring gear.

The frictional elements may include: a first clutch disposed between the first ring gear as well as the input shaft and the first transfer gear; a second clutch disposed between the second planet carrier and the third ring gear; a third clutch disposed between the first planet carrier and the first transfer gear; a fourth clutch disposed between the first sun gear and the third transfer gear; and a first brake disposed between the first sun gear and the transmission housing.

The first brake and the first and fourth clutches may be operated at a first forward speed; the first brake and the third and fourth clutches may be operated at a second forward speed; the first, third, and fourth clutches may be operated at a third forward speed; the second, third, and fourth clutches may be operated at a fourth forward speed; the first, second, and fourth clutches may be operated at a fifth forward speed; the first, second, and third clutches may be operated at a sixth forward speed; the first brake and the first and second clutches may be operated at a seventh forward speed; the first brake and the second and third clutches may be operated at an eighth forward speed; and the first brake and the second and fourth clutches may be operated at a reverse speed.

A planetary gear train of an automatic transmission for a vehicle according to another exemplary embodiment of the present inventive concept includes: an input shaft receiving torque of an engine; an output shaft disposed in parallel with the input shaft; a first planetary gear set disposed on the input shaft, the first planetary gear set including a first ring gear directly connected to the input shaft so as to be always operated as an input element, a first planet carrier, and a first sun gear selectively operated as a fixed element, as rotation elements thereof; a second planetary gear set disposed on the output shaft, the second planetary gear set including a second sun gear connected to the first planet carrier, a second planet carrier selectively connected to the first sun gear, and a second ring gear, as rotation elements thereof; a third planetary gear set disposed on the output shaft, the third planetary gear set including a third sun gear selectively connected to the first ring gear and the input shaft, a third planet carrier directly connected to the second ring gear and the output shaft, and a third ring gear selectively connected to the first sun gear and selectively connected to the second planet carrier, as rotation elements thereof; a first transfer gear connecting the first ring gear and the input shaft to the third sun gear; a second transfer gear connecting the first planet carrier to the second sun gear; a third transfer gear connecting the first sun gear to the third ring gear; and frictional elements selectively interconnecting the rotation elements or selectively connecting the rotation elements to a transmission housing.

The frictional elements may include: a first clutch disposed between the first ring gear as well as the input shaft and the first transfer gear; a second clutch disposed between the second planet carrier and the third ring gear; a third clutch disposed between the first planet carrier and the first transfer gear; a fourth clutch disposed between the first sun gear and the third transfer gear; and a first brake disposed between the first sun gear and the transmission housing.

BRIEF DESCRIPTION OF THE DRAWINGS

The foregoing and other features of the inventive concept will be apparent from a description of various exemplary embodiments of the inventive concept described herein, as illustrated in the accompanying drawings in which like reference characters may refer to the same or similar parts throughout different views. The illustrated drawings are not necessarily to scale, an emphasis is instead placed on illustrating the principles of the exemplary embodiments of the inventive concept.

DESCRIPTION OF SYMBOLS

PG1, PG2, PG3: first, second, and third planetary gear sets
S1, S2, S3: first, second, and third sun gears
PC1, PC2, PC3: first, second, and third planet carriers
R1, R2, R3: first, second, and third ring gears
IS: input shaft
OS: output shaft
B1: first brake
C1, C2, C3, C4: first, second, third, and fourth clutches
TF1, TF2, TF3: first, second, and third transfer gears

DETAILED DESCRIPTION

Exemplary embodiments of the present inventive concept will hereinafter be described in detail with reference to the accompanying drawings. In the following detailed description, only certain exemplary embodiments of the present inventive concept have been shown and described, simply by way of illustration. Various descriptions of components that are not necessary for explaining the exemplary embodiment are omitted for simplicity, and the same constituent elements are denoted by the same reference numerals in this specification. As those skilled in the art would realize, the described exemplary embodiments can be modified in various different ways, all without departing from the spirit or scope of the present inventive concept. Accordingly, the drawings and following detailed description are to be regarded as being illustrative in nature and not restrictive.

Further, in the detailed description, ordinal numbers are used for distinguishing constituent elements having the same terms, and have no specific meanings. Like reference numerals or symbols designate like elements throughout the specification. Hereinafter, exemplary embodiments of the present inventive concept are described in detail with reference to the accompanying drawings.

Figure 1:
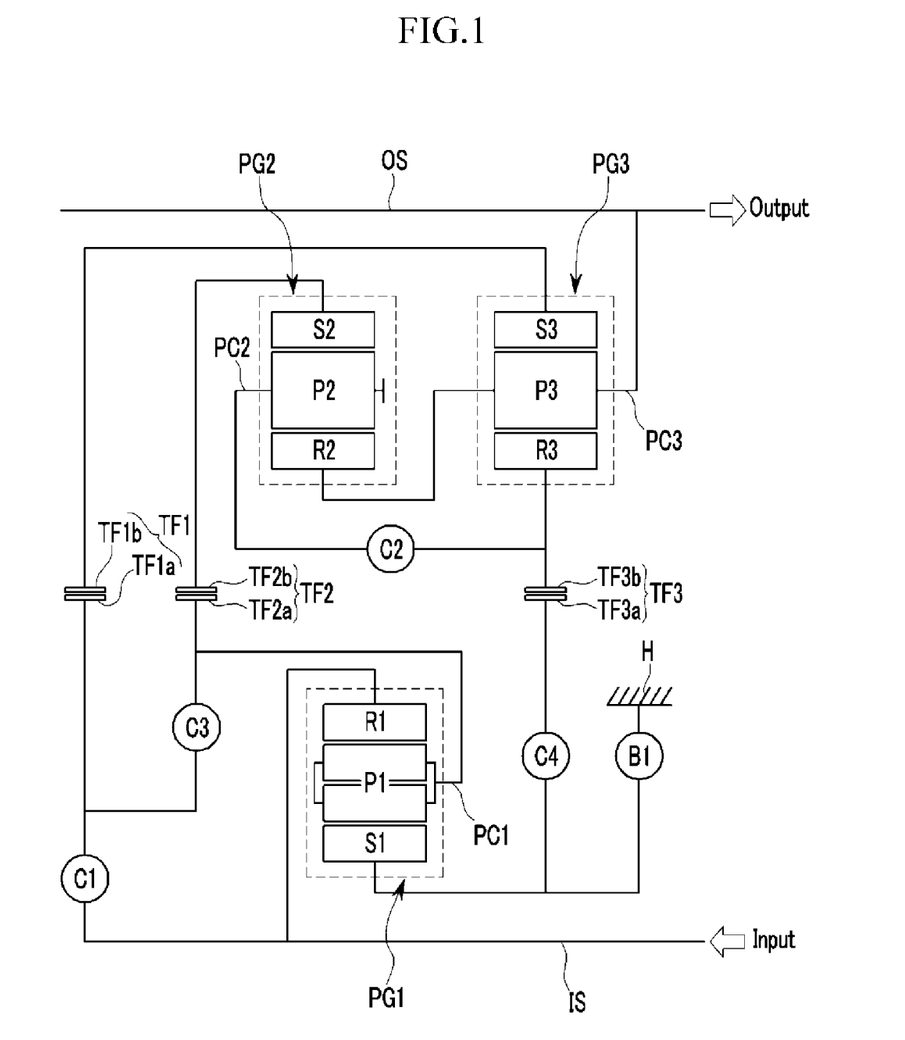
FIG. 1 is a schematic diagram of a planetary gear train according to an exemplary embodiment of the present inventive concept.

FIG. 1 is a schematic diagram of a planetary gear train according to an exemplary embodiment of the present inventive concept.

Referring to FIG. 1, a planetary gear train according to an exemplary embodiment of the present inventive concept includes first, second, and third planetary gear sets PG1, PG2, and PG3, five frictional elements B1, C1, C2, C3, and C4, and three transfer gears TF1, TF2, and TF3.

The first planetary gear set PG1 is disposed on an input shaft IS, and the second and third planetary gear sets PG2 and PG3 are disposed on an output shaft OS disposed apart from and in parallel with the input shaft IS.

The input shaft IS is an input member, supporting the first planetary gear set PG1 and transmitting torque from an engine to the first planetary gear set PG1.

The output shaft OS supports the second and third planetary gear sets PG2 and PG3 and transmits torque of an output member of the third planetary gear set PG3 to a final reduction gear (not shown) and a differential apparatus (not shown).

Therefore, the torque input from the input shaft IS is changed into eight forward speeds and one reverse speed by cooperation of the first, second, and third planetary gear sets PG1, PG2, and PG3, and is then output through the output shaft OS.

The first planetary gear set PG1 is a double pinion planetary gear set, and includes a first sun gear S1, a first ring gear R1, and a first planet carrier PC1 rotatably supporting a first pinion P1 engaged with the first sun gear S1 and the first ring gear R1 as rotation elements thereof.

The second planetary gear set PG2 is a single pinion planetary gear set, and includes a second sun gear S2, a second ring gear R2, and a second planet carrier PC2 supporting a second pinion P2 engaged with the second sun gear S2 and the second ring gear R2 are rotation elements thereof.

The third planetary gear set PG3 is a single pinion planetary gear set, and includes a third sun gear S3, a third ring gear R3, and a third planet carrier PC3 rotatably supporting a third pinion P3 engaged with the third sun gear S3 and the third ring gear R3 as rotation elements thereof.

The first ring gear R1 is directly connected to the input shaft IS, the second ring gear R2 is directly connected to the third planet carrier PC3, and the third planet carrier PC3 is directly connected to the output shaft OS in the first, second, and third planetary gear sets PG1, PG2, and PG3. In addition, the rotation elements of the first, second, and third planetary gear sets PG1, PG2, and PG3 are combined with each other through the first, second, and third transfer gears TF1, TF2, and TF3, and the frictional elements consisting of the first brake B1 and the first, second, third, and fourth clutches C1, C2, C3, and C4.

The first, second, and third transfer gears TF1, TF2, and TF3 respectively have first, second, and third transfer drive gears TF1a, TF2a, and TF3a and first, second, and third transfer driven gears TF1b, TF2b, and TF3b externally meshed with each other.

The first transfer gear TF1 connects the first ring gear R1 as well as the input shaft IS to the third sun gear S3. The second transfer gear TF2 connects the first planet carrier PC1 to the second sun gear S2. The third transfer gear TF3 connects the first sun gear S1 to the third ring gear R3.

Therefore, the rotation elements connected to each other by the first, second, and third transfer gears TF1, TF2, and TF3 are rotated in opposite directions to each other. Gear ratios of the first, second, and third transfer gears TF1, TF2, and TF3 are set according to speed ratios demanded at shift-speeds.

Arrangements of the frictional elements B1, C1, C2, C3, and C4 will be described in detail.

The first brake B1 is disposed between the first sun gear S1 and the transmission housing H.

The first clutch C1 is disposed between the first ring gear R1 and the input shaft IS together with the first transfer drive gear TF1a.

The second clutch C2 is disposed between the second planet carrier PC2 and the third transfer driven gear TF3b.

The third clutch C3 is disposed between the first planet carrier PC1 and the first transfer drive gear TF1a.

The fourth clutch C4 is disposed between the first sun gear S1 and the third transfer drive gear TF3a.

The frictional elements consisting of the first, second, third, and fourth clutches C1, C2, C3, and C4 and the first brake B1 are conventional multi-plate friction elements of a wet type that are operated by hydraulic pressure.

Figure 2:
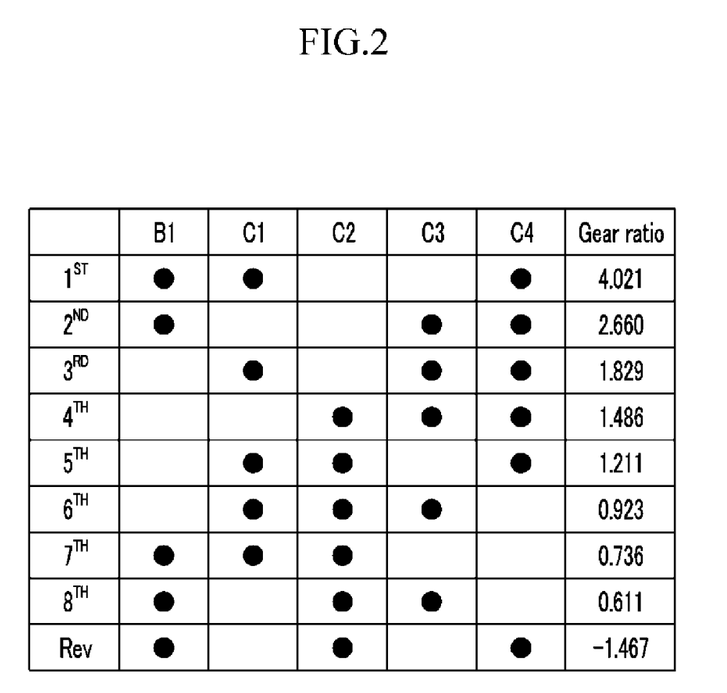
FIG. 2 is an operational chart of friction members at each shift-speed applied to a planetary gear train according to an exemplary embodiment of the present inventive concept.

FIG. 2 is an operational chart of frictional elements at each shift-speed applied to a planetary gear train according to an exemplary embodiment of the present inventive concept.

As shown in FIG. 2, three frictional elements are operated at each shift-speed in the planetary gear train according to an exemplary embodiment of the present inventive concept.

For example, the first brake B1 and the first and fourth clutches C1 and C4 are operated at a first forward speed $1^{ST}$. The first brake B1 and the third and fourth clutches C3 and C4 are operated at a second forward speed $2^{ND}$. The first, third, and fourth clutches C1, C3, and C4 are operated at a third forward speed $3^{RD}$. The second, third, and fourth clutches C2, C3, and C4 are operated at a fourth forward speed $4^{TH}$. The first, second, and fourth clutches C1, C2, and C4 are operated at a fifth forward speed $5^{TH}$. The first, second, and third clutches C1, C2, and C3 are operated at a sixth forward speed $6^{TH}$. The first brake B1 and the first and second clutches C1 and C2 are operated at a seventh forward speed $7^{TH}$. The first brake B1 and the second and third clutches C2 and C3 are operated at an eighth forward speed $8^{TH}$. The first brake B1 and the second and fourth clutches C2 and C4 are operated at a reverse speed Rev.

FIGS. 3A-3I are lever diagrams of the planetary gear train at each shift-speed according to the exemplary embodiment of the present inventive concept, and illustrate shift processes of the planetary gear train according to the exemplary embodiment of the present inventive concept by a lever analysis method.

Referring to FIG. 3A to FIG. 3I, three vertical lines of the first planetary gear set PG1 are set as the first sun gear S1, the first ring gear R1, and the first planet carrier PC1; three vertical lines of the second planetary gear set PG2 are set as the second sun gear S2, the second planet carrier PC2, and the second ring gear R2; and three vertical lines of the third planetary gear set PG3 are set as the third sun gear S3, the third planet carrier PC3, and the third ring gear R3 from the left to the right.

In addition, a middle horizontal line represents a rotation speed of "0", an upper horizontal line represents a rotation speed of "1.0", and a lower horizontal line represents a rotation speed of "−1.0". A symbol "−" means that rotational elements are rotated in an opposite direction of a rotational direction of the engine. It is because the rotation elements are externally meshed with each other through the first, second, and third transfer gears TF1, TF2, and TF3 without an idling gear. In addition, the rotation speed of "1.0" represents the same rotational speed as that of the input shaft IS. Distances between the vertical lines of the first, second, and third planetary gear sets PG1, PG2, and PG3 are set according to each gear ratio (i.e., a teeth number of a sun gear/a teeth number of a ring gear).

Hereinafter, referring to FIG. 2 and FIGS. 3A-3I, the shift processes of the planetary gear train according to an exemplary embodiment of the present inventive concept will be described in detail.

[First Forward Speed]

Referring to FIG. 2, the first brake B1 and the first and fourth clutches C1 and C4 are operated at the first forward speed $1^{ST}$.

Figure 3A:
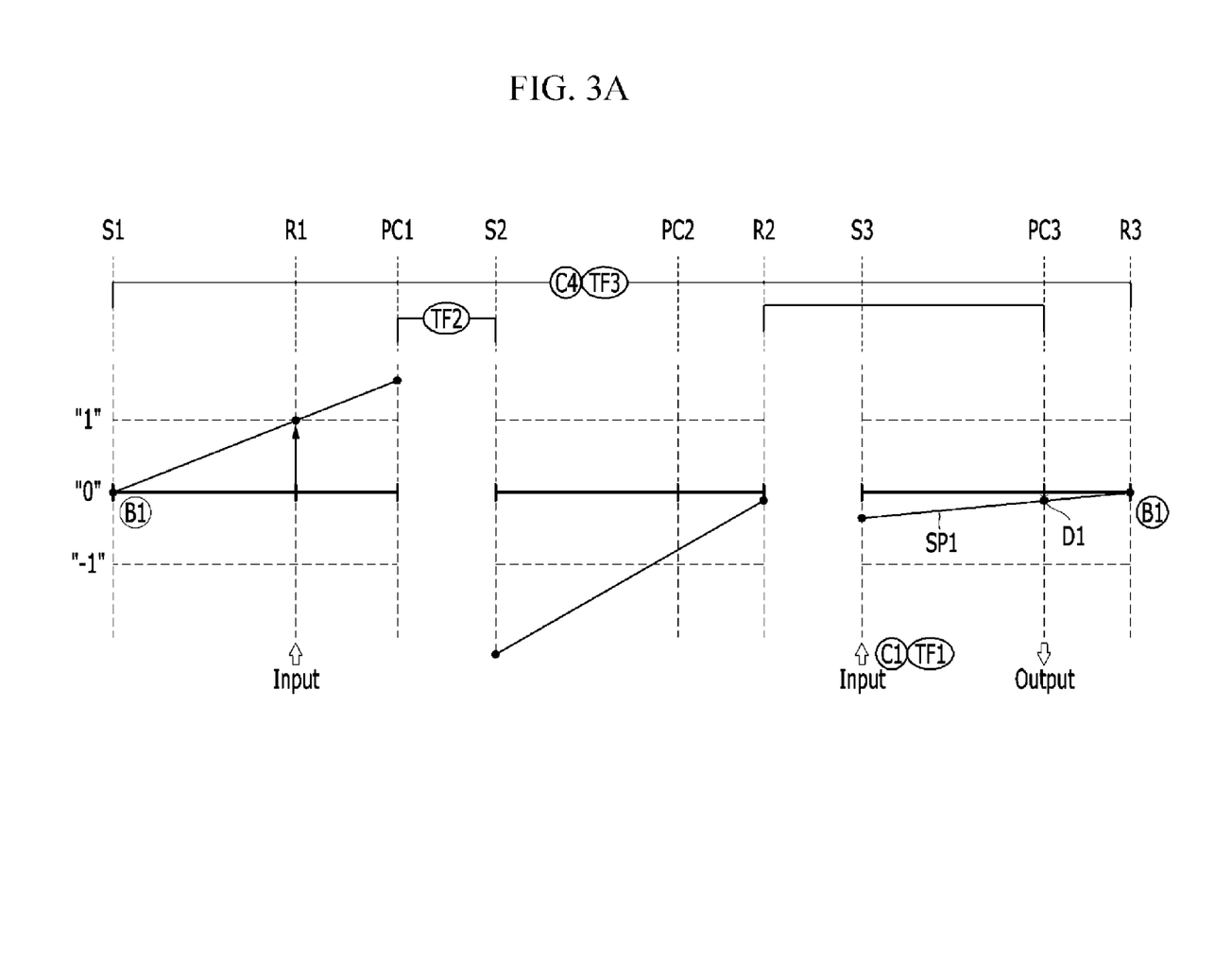
FIG. 3A is a lever diagram of a planetary gear train at the first forward speed according to an exemplary embodiment of the present inventive concept.

As shown in FIG. 3A, the rotation speed of the input shaft IS is input to the first ring gear R1, and is changed according to the gear ratio of the first transfer gear TF1 and is then input to the third sun gear S3 as an inverse rotation speed by operation of the first clutch C1. At this state, the first sun gear S1 and the third ring gear R3 are operated as fixed elements by operation of the first brake B1 and the fourth clutch C4.

Therefore, the rotation elements of the third planetary gear set PG3 form a first shift line SP1 and D1 is output through the third planet carrier PC3 that is the output element.

[Second Forward Speed]

Figure 3B:
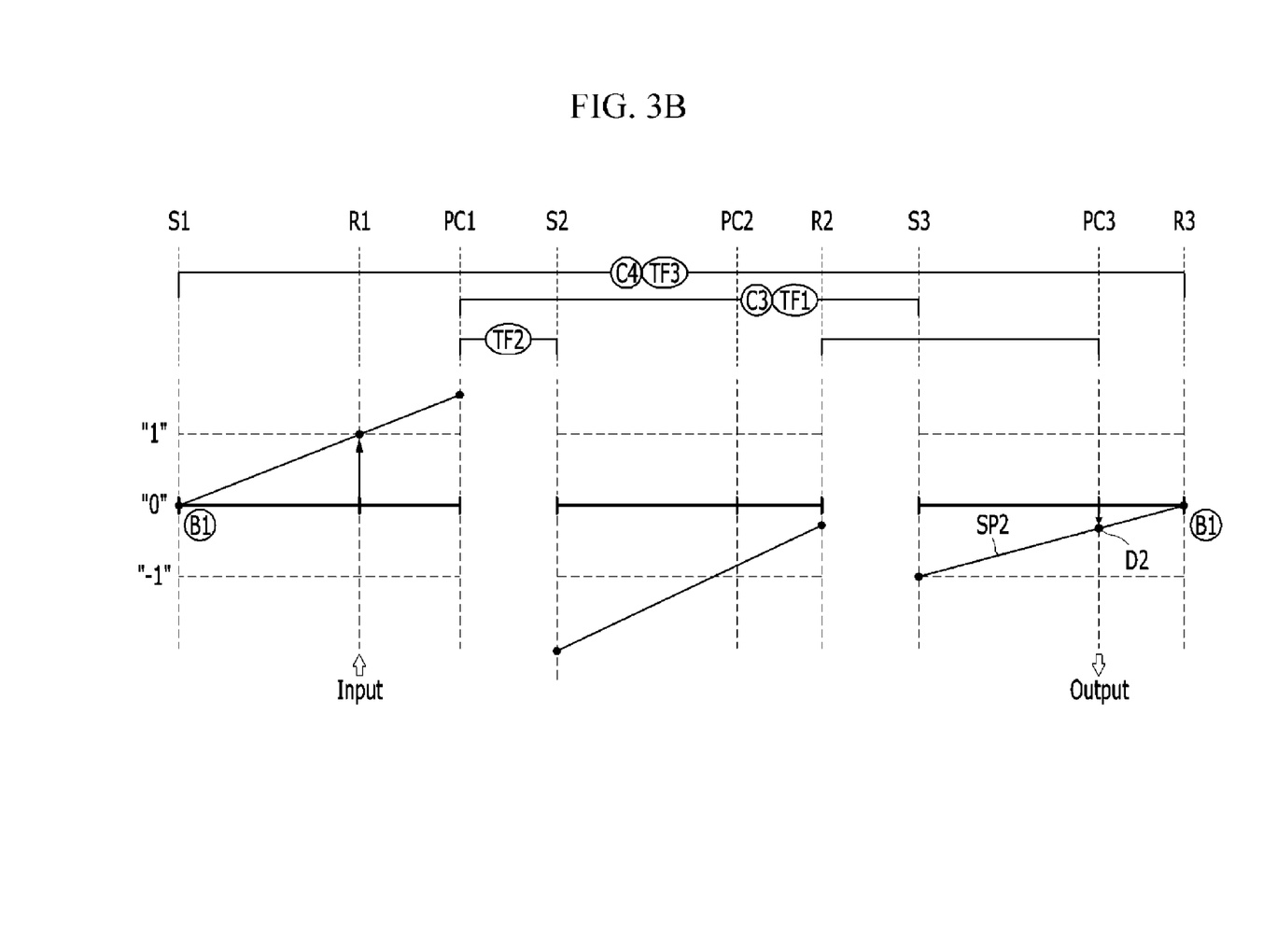
FIG. 3B is a lever diagram of a planetary gear train at the second forward speed according to an exemplary embodiment of the present inventive concept.

The first clutch C1 that was operated at the first forward speed $1^{ST}$ is released and the third clutch C3 is operated at the second forward speed $2^{ND}$.

As shown in FIG. 3B, the rotation speed of the input shaft IS is input to the first ring gear R1, and the first sun gear S1 and the third ring gear R3 are operated as the fixed elements by operation of the first brake B1 and the fourth clutch C4. In addition, a rotation speed of the first planet carrier PC1 is changed according to the gear ratio of the first transfer gear TF1 and is then input to the third sun gear S3 as an inverse rotation speed by operation of the third clutch C3. Therefore, the rotation elements of the third planetary gear set PG3 form a second shift line SP2 and D2 is output through the third planet carrier PC3 that is the output element.

[Third Forward Speed]

Figure 3C:
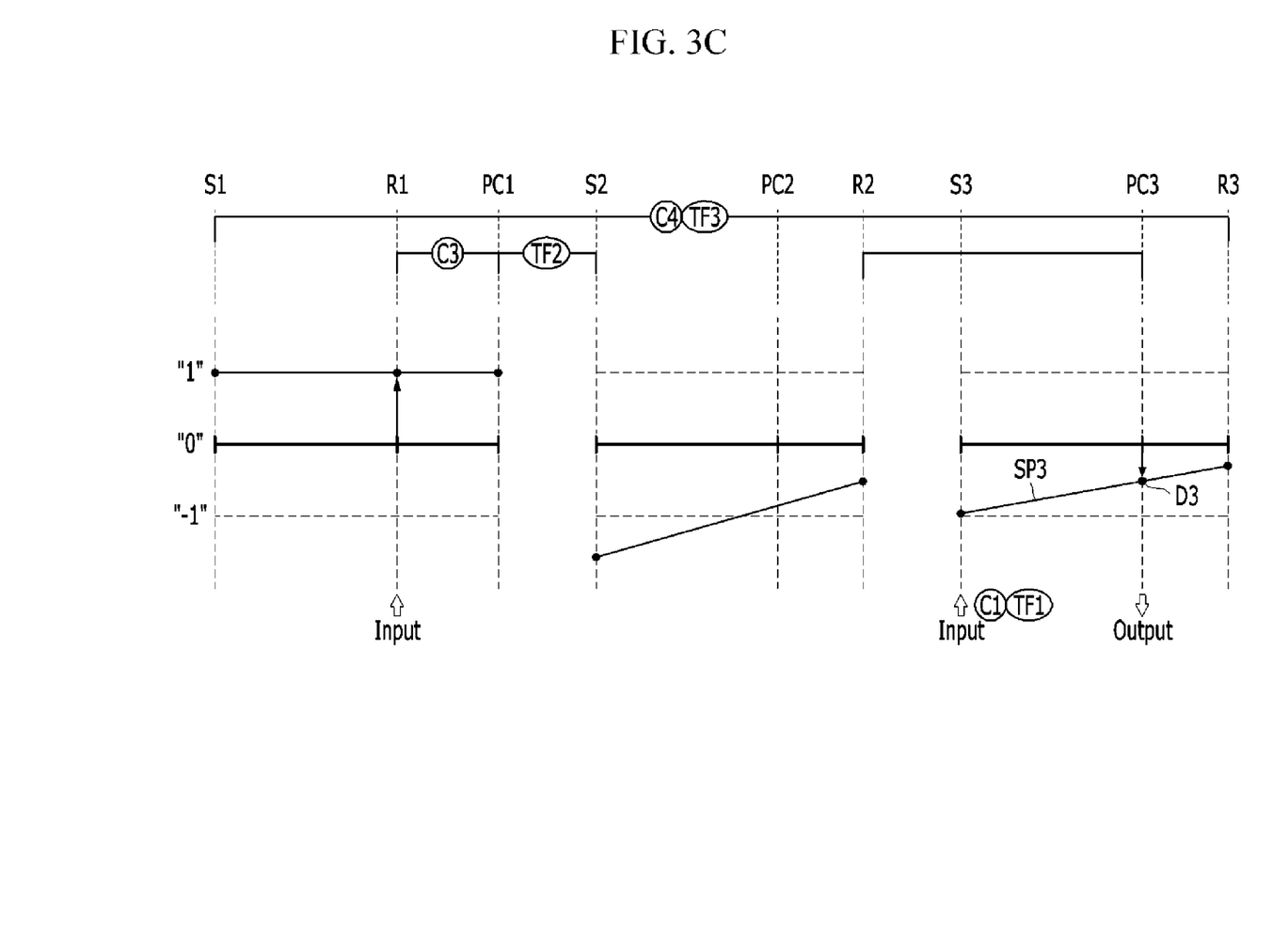
FIG. 3C is a lever diagram of a planetary gear train at the third forward speed according to an exemplary embodiment of the present inventive concept.

The first brake B1 that was operated at the second forward speed $2^{ND}$ is released and the first clutch C1 is operated at the third forward speed $3^{RD}$.

As shown in FIG. 3C, the rotation speed of the input shaft IS is input to the first ring gear R1 and the first planetary gear set PG1 becomes a direct-coupling state by operation of the first and third clutches C1 and C3. Therefore, the rotation speed of the input shaft IS is changed according to the gear ratios of the first and second transfer gears TF1 and TF2 and is then input to the third sun gear S3 and the second sun gear S2 as inverse rotation speeds, respectively. In addition, a rotation speed of the first sun gear S1 is changed according to the gear ratio of the third transfer gear TF3 and is then input to the third ring gear R3 as an inverse rotation speed by operation of the fourth clutch C4. Therefore, the rotation elements of the third planetary gear set PG3 form a third shift line SP3 and D3 is output through the third planet carrier PC3 that is the output element.

[Fourth Forward Speed]

Figure 3D:
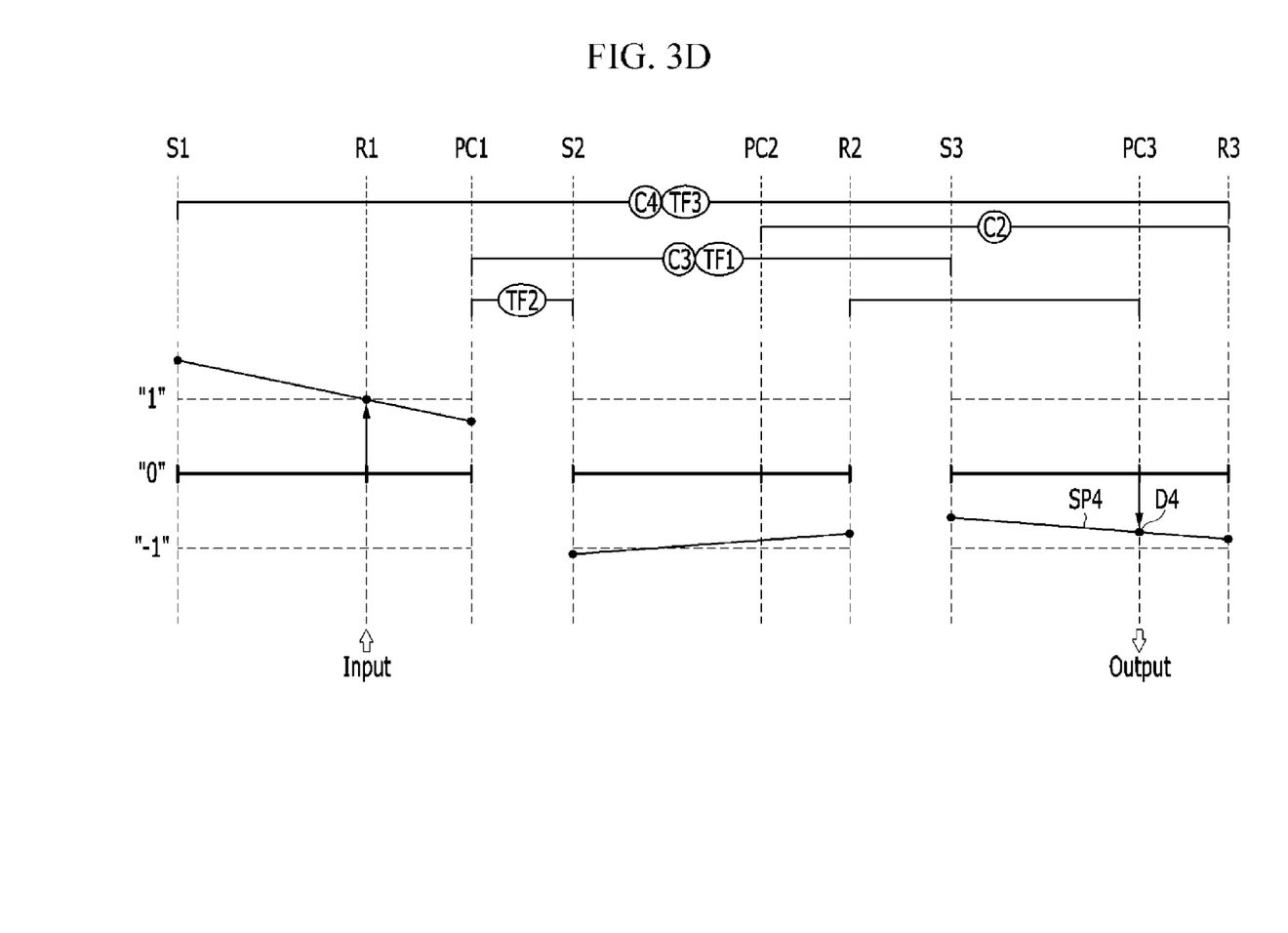
FIG. 3D is a lever diagram of a planetary gear train at the fourth forward speed according to an exemplary embodiment of the present inventive concept.

The first clutch C1 that was operated at the third forward speed $3^{RD}$ is released and the second clutch C2 is operated at the fourth forward speed $4^{TH}$.

As shown in FIG. 3D, the rotation speed of the input shaft IS is input to the first ring gear R1, and the rotation speed of the first planet carrier PC1 is changed according to the gear ratio of the first transfer gear TF1 and is then input to the third sun gear S3 as the inverse rotation speed by operation of the third clutch C3. In addition, the rotation speed of the first sun gear S1 is changed according to the gear ratio of the third transfer gear TF3 and is then input to the third ring gear R3 and the second planet carrier PC2 as the inverse rotation speeds by operation of the fourth clutch C4 and the second clutch C2, respectively. Therefore, the rotation elements of the third planetary gear set PG3 form a fourth shift line SP4 and D4 is output through the third planet carrier PC3 that is the output element.

[Fifth Forward Speed]

Figure 3E:
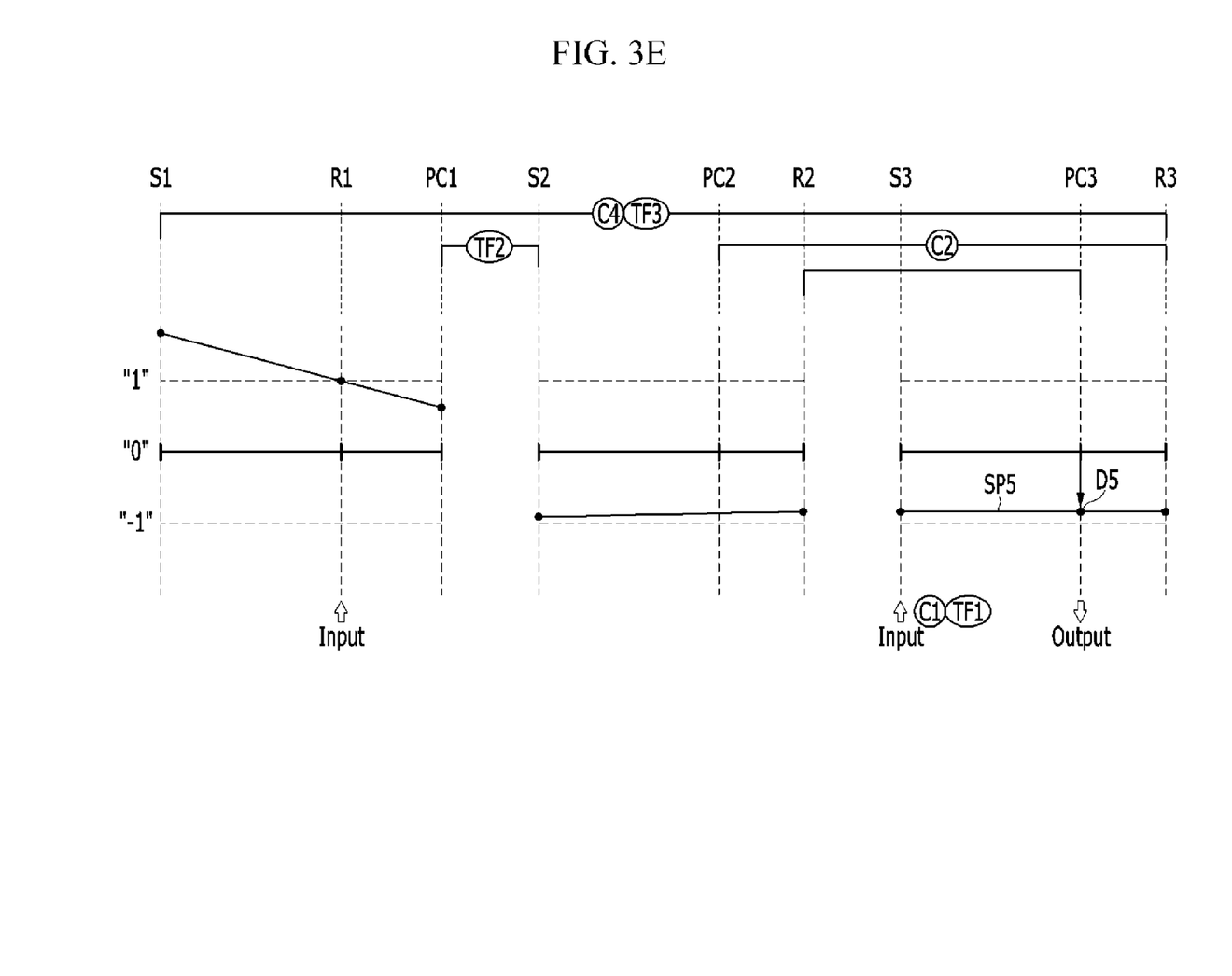
FIG. 3E is a lever diagram of a planetary gear train at the fifth forward speed according to an exemplary embodiment of the present inventive concept.

The third clutch C3 that was operated at the fourth forward speed $4^{TH}$ is released and the first clutch C1 is operated at the fifth forward speed $5^{TH}$.

As shown in FIG. 3E, the rotation speed of the input shaft IS is input to the first ring gear R1, and is changed according to the gear ratio of the first transfer gear TF1 and is then input to the third sun gear S3 as the inverse rotation speed by operation of the first clutch C1. In addition, the rotation speed of the first planet carrier PC1 is changed according to the gear ratio of the second transfer gear TF2 and is then input to the second sun gear S2 as the inverse rotation speed. The rotation speed of the first sun gear S1 is changed according to the gear ratio of the third transfer gear TF3 and is then input to the third ring gear R3 and the second planet carrier PC2 as the inverse rotation speeds by operation of the fourth clutch C4 and the second clutch C2, respectively. Therefore, the rotation elements of the third planetary gear set PG3 form a fifth shift line SP5 and D5 is output through the third planet carrier PC3 that is the output element.

[Sixth Forward Speed]

Figure 3F:
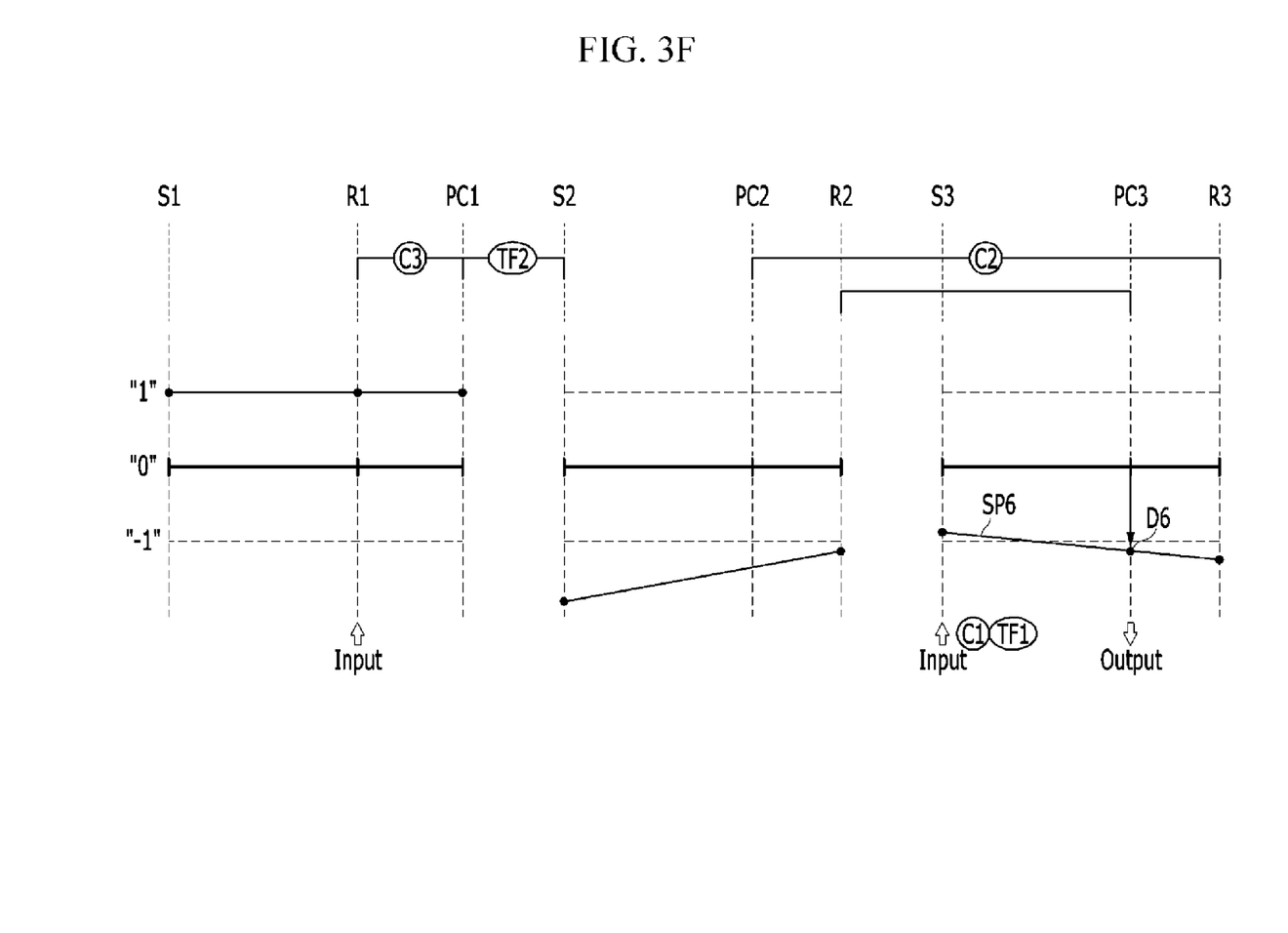
FIG. 3F is a lever diagram of a planetary gear train at the sixth forward speed according to an exemplary embodiment of the present inventive concept.

The fourth clutch C4 that was operated at the fifth forward speed $5^{TH}$ is released and the third clutch C3 is operated at the sixth forward speed $6^{TH}$.

As shown in FIG. 3F, the rotation speed of the input shaft IS is input to the first ring gear R1, and the first planetary gear set PG1 becomes the direct-coupling state by operation of the first and third clutches C1 and C3. Therefore, the rotation speed of the input shaft IS is changed according to the gear ratios of the first and second transfer gears TF1 and TF2 and is then input to the third sun gear S3 and the second sun gear S2 as the inverse rotation speeds, respectively. In addition, the second planet carrier PC2 is connected to the third ring gear R3 by operation of the second clutch C2. Therefore, the rotation elements of the third planetary gear set PG3 form a sixth shift line SP6 and D6 is output through the third planet carrier PC3 that is the output element.

[Seventh Forward Speed]

Figure 3G:
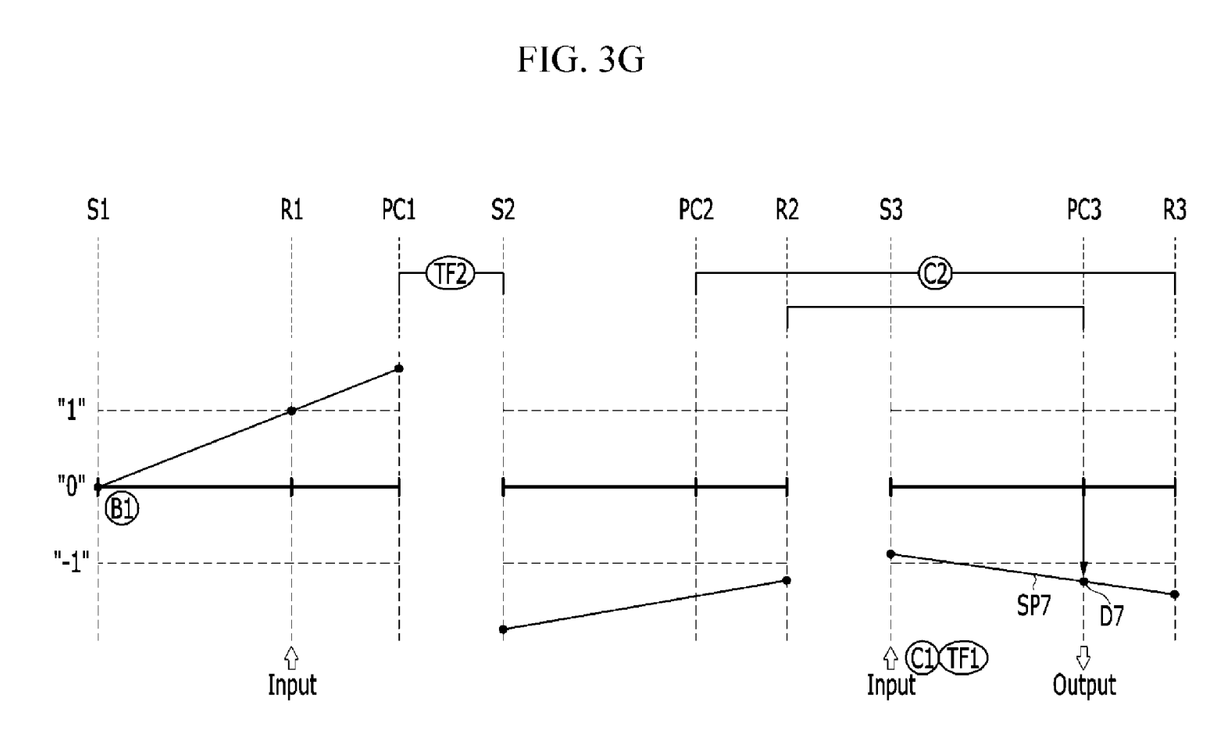
FIG. 3G is a lever diagram of a planetary gear train at the seventh forward speed according to an exemplary embodiment of the present inventive concept.

The third clutch C3 that was operated at the sixth forward speed $6^{TH}$ is released and the first brake B1 is operated at the seventh forward speed $7^{TH}$.

As shown in FIG. 3G, the rotation speed of the input shaft IS is input to the first ring gear R1, and is changed according to the gear ratio of the first transfer gear TF1 and is then input to the third sun gear S3 as the inverse rotation speed by operation of the first clutch C1. In addition, the first sun gear S1 is operated as the fixed element by operation of the first brake B1. The rotation speed of the first planet carrier PC1 is changed according to the gear ratio of the second transfer gear TF2 and is then input to the second sun gear S2 as the inverse rotation speed, and the second planet carrier PC2 is connected to the third ring gear R3 by operation of the second clutch C2. Therefore, the rotation elements of the third planetary gear set PG3 form a seventh shift line SP7 and D7 is output through the third planet carrier PC3 that is the output element.

[Eighth Forward Speed]

Figure 3H:
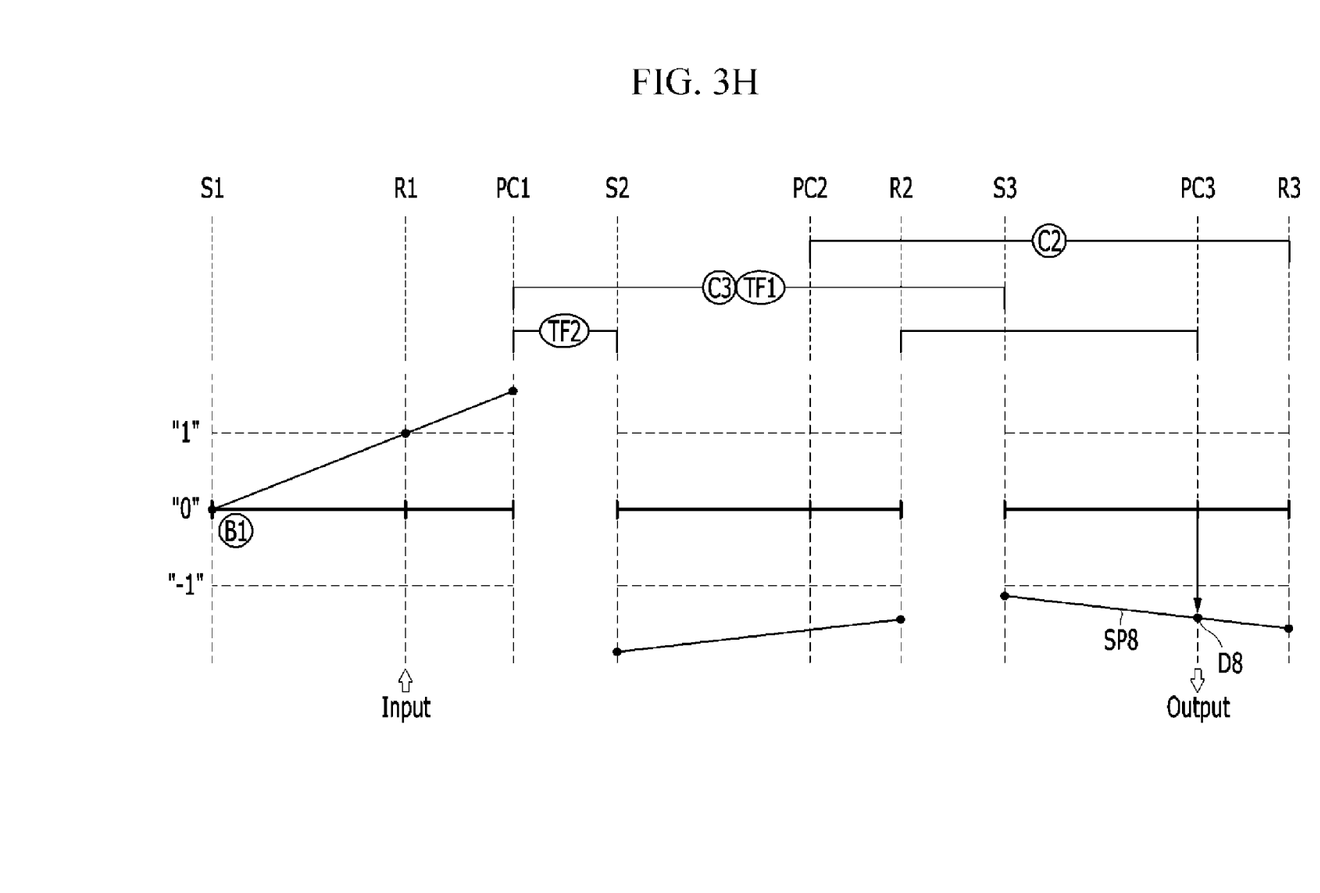
FIG. 3H is a lever diagram of a planetary gear train at the eighth forward speed according to an exemplary embodiment of the present inventive concept.

The first clutch C1 that was operated at the seventh forward speed $7^{TH}$ is released and the third clutch C3 is operated at the eighth forward speed $8^{TH}$.

As shown in FIG. 3H, the rotation speed of the input shaft IS is input to the first ring gear R1 and the first sun gear S1 is operated as the fixed element by operation of the first brake B1. Therefore, the rotation speed of the first planet carrier PC1 is changed according to the gear ratio of the first transfer gear TF1 and is then input to the third sun gear S3 as the inverse rotation speed by operation of the third clutch C3. In addition, the rotation speed of the first planet carrier PC1 is changed according to the gear ratio of the second transfer gear TF2 and is then input to the second sun gear S2 as the inverse rotation speed. At this state, the second planet carrier PC2 is connected to the third ring gear R3 by operation of the second clutch C2. Therefore, the rotation elements of the third planetary gear set PG3 form an eighth shift line SP8 and D8 is output through the third planet carrier PC3 that is the output element.

[Reverse Speed]

Figure 3I:
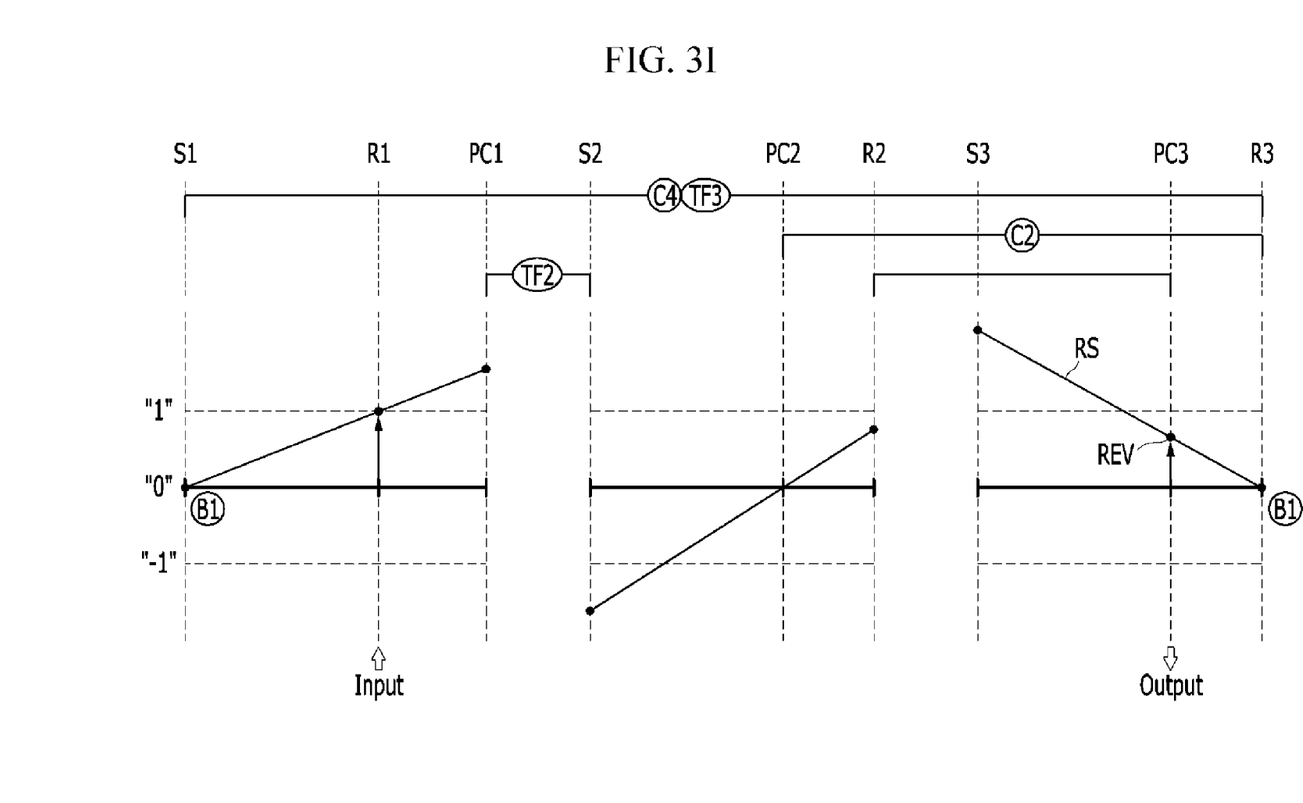
FIG. 3I is a lever diagram of a planetary gear train at a reverse speed according to an exemplary embodiment of the present inventive concept.

As shown in FIG. 2, the first brake B1 and the second and fourth clutches C2 and C4 are operated at the reverse speed Rev. As shown in FIG. 3I, the rotation speed of the input shaft IS is input to the first ring gear R1, and the first sun gear S1, the second planet carrier PC2 and the third ring gear R3 are operated as the fixed elements by operation of the first brake B1 and the second and fourth clutches C2 and C4. In addition, the rotation speed of the first planet carrier PC1 is changed according to the gear ratio of the second transfer gear TF2 and is then input to the second sun gear S2 as the inverse rotation speed. Therefore, the rotation elements of the third planetary gear set PG3 form a reverse shift line RS and REV is output through the third planet carrier PC3 that is the output element. Since three planetary gear sets are separately disposed on the input shaft and the output shaft disposed apart from and in parallel with each other in the planetary gear train according to an exemplary embodiment of the present inventive concept, a length thereof may be reduced and mountability may be improved.

In addition, optimum gear ratios may be set due to ease of changing gear ratios by using three external-meshing gears as well as the planetary gear sets. Since gear ratios can be changed according to target performance, starting performance may be improved. Therefore, a start-up clutch instead of a torque converter may be used.

Since three frictional elements are operated at each shift-speed, non-operated frictional element may be minimized and drag torque may be reduced. In addition, fuel consumption may be reduced by increasing power delivery efficiency.

In addition, since a torque load of each frictional element can be reduced, a compact design is possible.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A planetary gear train of an automatic transmission for a vehicle, comprising:
   an input shaft receiving torque of an engine;
   an output shaft disposed in parallel with the input shaft;
   a first planetary gear set disposed on the input shaft, the first planetary gear set including a first ring gear directly connected to the input shaft so as to be always operated as an input element, a first planet carrier selectively operated as an output element, and a first sun gear selectively operated as an output element and a fixed element, as rotation elements thereof;
   a second planetary gear set disposed on the output shaft, the second planetary gear set including a second sun gear connected to the first planet carrier through an externally-meshed gear, a second planet carrier selectively connected to the first sun gear through an externally-meshed gear, and a second ring gear operated as an output element, as rotation elements thereof;
   a third planetary gear set disposed on the output shaft, the third planetary gear set including a third sun gear selectively connected to the first ring gear and the input shaft through an externally-meshed gear, a third planet carrier directly connected to the second ring gear and the output shaft, and a third ring gear selectively connected to the first sun gear through an externally-meshed gear and selectively connected to the second planet carrier as rotation elements thereof;
   three transfer gears forming the externally-meshed gears; and
   frictional elements selectively interconnecting the rotation elements or selectively connecting the rotation elements to a transmission housing.

2. The planetary gear train of claim 1, wherein the first planetary gear set is a double pinion planetary gear set and each of the second and third planetary gear sets is a single pinion planetary gear set.

3. The planetary gear train of claim 1, wherein the three transfer gears comprise:

a first transfer gear including a first transfer drive gear selectively connected to the first ring gear and the input shaft and a first transfer driven gear connected to the third sun gear;

a second transfer gear including a second transfer drive gear connected to the first planet carrier and a second transfer driven gear connected to the second sun gear; and a third transfer gear including a third transfer drive gear selectively connected to the first sun gear and a third transfer driven gear connected to the third ring gear.

4. The planetary gear train of claim 3, wherein the frictional elements comprise:
   a first clutch disposed between the first ring gear as well as the input shaft and the first transfer gear;
   a second clutch disposed between the second planet carrier and the third ring gear;
   a third clutch disposed between the first planet carrier and the first transfer gear;
   a fourth clutch disposed between the first sun gear and the third transfer gear; and
   a first brake disposed between the first sun gear and the transmission housing.

5. The planetary gear train of claim 4, wherein:
   the first brake and the first and fourth clutches are operated at a first forward speed,
   the first brake and the third and fourth clutches are operated at a second forward speed,
   the first, third, and fourth clutches are operated at a third forward speed,
   the second, third, and fourth clutches are operated at a fourth forward speed,
   the first, second, and fourth clutches are operated at a fifth forward speed,
   the first, second, and third clutches are operated at a sixth forward speed,
   the first brake and the first and second clutches are operated at a seventh forward speed,
   the first brake and the second and third clutches are operated at an eighth forward speed, and
   the first brake and the second and fourth clutches are operated at a reverse speed.

6. A planetary gear train of an automatic transmission for a vehicle, comprising:
   an input shaft receiving torque of an engine;
   an output shaft disposed in parallel with the input shaft;
   a first planetary gear set disposed on the input shaft, the first planetary gear set including a first ring gear directly connected to the input shaft so as to be always operated as an input element, a first planet carrier, and a first sun gear selectively operated as a fixed element, as rotation elements thereof;
   a second planetary gear set disposed on the output shaft, the second planetary gear set including a second sun gear connected to the first planet carrier, a second planet carrier selectively connected to the first sun gear, and a second ring gear, as rotation elements thereof;
   a third planetary gear set disposed on the output shaft, the third planetary gear set including a third sun gear selectively connected to the first ring gear and the input shaft, a third planet carrier directly connected to the second ring gear and the output shaft, and a third ring gear selectively connected to the first sun gear and selectively connected to the second planet carrier as rotation elements thereof;
   a first transfer gear connecting the first ring gear and the input shaft to the third sun gear;

a second transfer gear connecting the first planet carrier to the second sun gear;

a third transfer gear connecting the first sun gear to the third ring gear; and frictional elements selectively interconnecting the rotation elements or selectively connecting the rotation element to a transmission housing.

7. The planetary gear train of claim 6, wherein:

the frictional elements comprise:

a first clutch disposed between the first ring gear as well as the input shaft and the first transfer gear;

a second clutch disposed between the second planet carrier and the third ring gear;

a third clutch disposed between the first planet carrier and the first transfer gear;

a fourth clutch disposed between the first sun gear and the third transfer gear; and a first brake disposed between the first sun gear and the transmission housing.

* * * * *